Jan. 28, 1964 J. J. M. MAZENKO ETAL 3,119,172

METHOD OF MAKING AN ELECTRICAL CONNECTION

Filed May 15, 1959

INVENTORS
JEROME J. M. MAZENKO
MARTIN N. HALLER
BY Wade Koontz and
Oswald T. McCoy
ATTORNEYS United States Patent Office 3,119,172

Patented Jan. 28, 1964

3,119,172
METHOD OF MAKING AN ELECTRICAL CONNECTION

Jerome J. M. Mazenko and Martin N. Haller, Pittsburgh, Pa., assignors to the United States of America as represented by the Secretary of the Air Force Filed May 15, 1959, Ser. No. 813,608
1 Claim. (Cl. 29—155.5)

Figure 1:
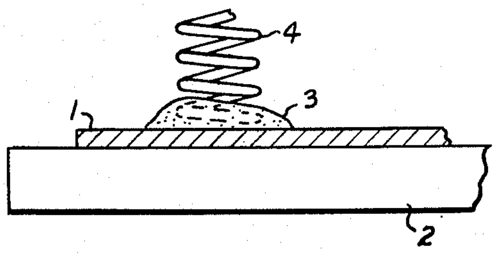

This invention relates to a composition and to a method for attaching wires to the printed circuits used in the intelligence transmission field of computers and the like.

A background for imparting a clear understanding of this invention as claimed is available in published works on printed circuits and computers, compositions, printing and stenciling materials and methods, etc. Circuits are printed when an electrically conductive material is produced on an insulated surface along the path of circuitry.

The methods of printing commonly are by painting, spraying, chemical deposition, vacuum processes, die-stamping, dusting, etc. The printed circuit illustratively may be 0.005 inch thick. The printed circuit is admirably adapted to miniaturization. Prior to the advent of printed circuits a small radio required over 100 soldering operations and a television set required about 500 soldering operations.

The conductors in printed circuitry commonly may be a noble metal, copper, etc. Powdered silver, flake silver, sheet silver, silver oxide, silver nitrate, etc. are used as paint pigments. Binders commonly are resins, phenolics dissolved in acetone, silicones dissolved in chlorinated hydrocarbons, linseed oil, castor oil, cottonseed oil, lacquer, lead borate, lead silicate, ethyl silicate, etc. Solvents are chlorinated solvents, alcohols, aromatics, ketones, acetates, etc.

External leads may be soldered directly to the circuit metal, to eyelets on which the metal terminates in holes at printed wiring terminals, etc. The solder used on a silver circuit metal preferably contains about 2% silver to saturate against further absorption of silver. Illustrative publications in this field are patents numbered 2,752,-663; 2,682,480; 2,610,128; and 2,679,568.

Pine oil is a general term applied to the variety of oils referred to as the terpenes, of the composition $C_{10}H_{16}$. They are obtained as distillates from pine wood. Their range of specific gravity is from 0.925 to 0.935. They have a moisture content below 0.5%; a refractive index of 1.479; a flashpoint above 60° C; and 90% of pine oil distills over below 220° C. Pine oil is referred to as a solvent for ethyl cellulose and for colophony in the issued Patents 2,682,480 and 2,610,128, respectively.

Squeegee oils are referred to in the issued Patent 2,682,-480 together with ethyl cellulose in pine oil, etc. Both the squeegee oils and the pine oil volatilize almost totally without a carbonaceous residue during the firing operations contemplated herein.

A brief summary of the invention follows, indicating its nature and substance together with a statement of the objects of the invention commensurate and consistent with the invention as claimed and also setting out the exact nature, the operation and essence of the invention complete with proportions and techniques that are necessary with its use. The purpose of the invention also is stipulated. The presentation is adequate for any person who is skilled in the art and science to which the invention pertains to use it without involving extensive experimentation. The best mode of carrying out the invention is presented by the citing of a specific operative example inclusive of the preparation and the use of at least one example of the invention.

An important item in the testing and in the operation of high temperature printed electronic components is the joining of connecting wires to the components and to the complete circuit. A composition and a method for joining connecting wires with printed circuitry on a ceramic substrate for subsequent testing or operative use up to temperatures as high as 750° C. are described herein as a gold glaze; a platinum glaze; a silver glaze, etc. The fired joining composition is amply strong to withstand normal stresses and provides good conductivity for signal transmission in the range of from 600 to 750° C. in which temperature range earlier comparable joints failed.

An object of this invention is to provide a joining composition for printed electronic components and circuits that will facilitate the bonding of connecting or lead-in wires to printed terminals. Another object is to provide a joining composition having a tensile strength of over 5,000 p.s.i. at an operating temperature of 600° C. for the gold glaze and over 10,000 p.s.i. at 750° C. for the platinum glaze, the tensile strengths being a function of the connecting wire cross-sectional area and the stress applied to the wire resulting in physical failure of the connection.

It is a further object of this invention to provide a joining composition that will not agglomerate during firing or lose its conducting properties at operating temperatures up to the 600 to 750° C. temperature range. Another object of the present invention is to provide a joining composition that will bond satisfactorily to platinum-, gold-, and silver-base printed terminals.

A considerable number of methods and compositions are available for the soldering, welding, casting, or otherwise joining of a connecting wire to a metal or a cermet but few will give satisfactory service at operating temperatures up to 750° C.

The composition described in the U.S. Patent 2,752,663, issued to J. S. White and L. G. Kutzer, has the firing temperature range of 590 to 760° C., and hence its physical strength is nil at operating temperatures in the range of from 600 to 750° C.

The composition described in U.S. Patent 2,679,568, issued to R. W. Smith and K. Schwartzwalder, consists of 70 to 89% nickel powder, 8 to 29% borosilicate glass, and 1 to 3% alkaline earth borate glass, with copper, silver, Nichrome, and iron powder being alternative metal powder substitutes for nickel. The magnesium borate glass consists of 95% $B_2O_3$ and 5% MgO. The alkaline earths are barium, calcium and strontium. The firing temperature for these compositions vary from 595° C. (1100° F.) to 925° C. (1700° F.), depending upon the relative quantities of the components used. The maximum operating temperature for compositions of this nature having acceptable physical strength and giving maximum conductivity has been found by laboratory investigation to be approximately 400° C. below that of the firing temperature of the mixture. These compositions therefore do not produce a connection with an operative strength within the approximate range of 600 to 750° C. comparable with that obtained by the composition described herein. All powders disclosed in this Smith and Schwartzwalder patent, except silver, tend to oxidize with continued use.

The invention disclosed herein uses a bonding mixture of lead- or barium-borosilicate glaze, a noble metal powder selected from the group consisting of platinum and gold, and an oily vehicle of a type similar to squeegee oil. The solids and the oily vehicle are mechanically mixed to a pasty, homogeneous consistency and the resulting bonding mixture is ready for application. The noble metal powder used preferably is of a particle size small enough to pass through a 325 mesh screen, or the maximum particle diameter size is less than 44 microns. The lead- or barium-borosilicate glaze may be obtained commercially from the O. Hommel Company, Maple Street, Carnegie, Pennsylvania, as the O. Hommel Glaze No. 640, 1607, 03200, 03201, or 03202, the major constituent of each being lead or barium-borosilicate. These glazes are proprietary lead-borosilicate base or barium-borosilicate-base powdered glazes of 325 mesh or finer. The glazes have the following approximate firing temperatures:

| Glaze No.: | Firing temp., ° C. |
|---|---|
| 640 | 920 |
| 1607 | 950 |
| 03200 | 1200 |
| 03201 | 1225 |
| 03202 | 1275 |

The lead borosilicate glazes consists of lead monoxide (PbO), boric oxide ($B_2O_3$) and silica ($SiO_2$). The firing temperatures of the lead borosilicate glazes increase with increases in their silica content and decrease in their lead monoxide and boric oxide contents.

The composition proportions of the glazes here of interest are derived from the ternary phase diagrams in Phase Diagrams for Ceramists, by E. M. Levin, H. F. McMurdie, and F. P. Hall, published in 1956 by The American Ceramic Society, 4055 N. High Street, Columbus 14, Ohio, at page 148 in FIGURE 399 for $SiO_2$-PbO-$B_2O_3$ and at page 104, in FIGURE 250 for $SiO_2$-BaO-$B_2O_3$ as being:

| | Percent by weight |
|---|---|
| Glaze No. 640: | |
| $B_2O_3$ | 0 to 3 |
| PbO | 70 to 72 |
| $SiO_2$ | 25 to 30 |
| Glaze No. 1607: | |
| $B_2O_3$ | 0 to 3 |
| PbO | 67 to 70 |
| $SiO_2$ | 27 to 33 |
| Glaze No. 03200: | |
| $B_2O_3$ | 9 to 11 |
| BaO | 48 to 56 |
| $SiO_2$ | 33 to 43 |
| Glaze No. 03201: | |
| $B_2O_3$ | 7 to 8 |
| BaO | 48.5 to 56.5 |
| $SiO_2$ | 35.5 to 44.5 |
| Glaze No. 03202: | |
| $B_2O_3$ | 3.5 to 5 |
| BaO | 49 to 57 |
| $SiO_2$ | 38 to 47.5 |

The oily vehicle, such as squeegee oil or pine oil, is of such purity that it is almost totally volatilized at a temperature less than the melting temperature of the glaze.

The quantities of the foregoing bonding mixture preferably include from 23 to 99% by volume of the total solids of noble metal powder selected from the group consisting of platinum and gold, from 1 to 77% by volume of the total solids of powdered lead-borosilicate glaze mixture or barium-borosilicate glaze mixture, and an additional 15 to 25% by volume of an oily vehicle such as squeegee oil. The quantities of metal powder used are inversely related to the quantities of glaze mixture, that is, 23% metal powder is mixed with 77% glaze mixture and 99% metal powder is mixed with 1% glaze mixture. The quantity of oily vehicle used will depend on the viscosity desired. For instance, if a viscous or thick mixture is preferred, the lesser volume or 15% vehicle is used in mixing.

Figure 2:
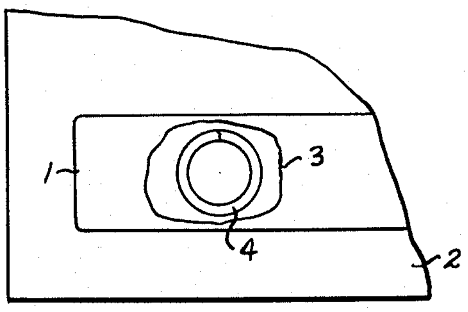

The application of the bonding mixture disclosed herein as an electronic component joining composition is shown in the accompanying drawing and is illustrated in an elevational fragmentary view, partly cross-sectioned in FIG. 1; and in a fragmentary plan view in FIG. 2.

In the accompanying drawing the printed terminal 1 on the substrate 2 is overlaid with a globule of bonding mixture 3. A cylindrically-wound connecting wire 4 is placed in the globule while wet, in a manner such that the lower loop of wire is completely covered with and is embedded within the bonding mixture. The connecting wire 4 preferably is spirally-wound and the globule of the bonding mixture 3 surrounds at least the complete lower turn. The bonding mixture 3 and the adjacent printed terminal area are then fired, as by being fired in air at the appropriate temperature or the like, within a temperature range depending on the specific bonding mixture used.

A preferred gold-bonding mixture contains from 23 to 99% by volume of total solids of gold powder, from 1 to 77% by voluume of total solids of a lead borosilicate powder such as the glaze No. 640, and an additional 15 to 25% by volume of an oily vehicle such as squeegee oil. The mixture is applied in fluid form to the substrate and then is fired at a minimum temperature of 920° C. and a maximum temperature of 1045° C. for approximately one-half hour, under one atmosphere of pressure. The substitution of the glaze No. 1607 for glaze No. 640 in the above formulation requires a change in the minimum firing temperature of from 920° C. to 950° C.

For a platinum bonding mixture containing from 23 to 99% by volume of total solids of platinum powder, from 1 to 77% by volume of total solids of a barium borosilicate powder such as the glaze No. 03200, and an additional 15 to 25% by volume of an oily vehicle such as squeegee oil, the mixture is fired at a minimum temperature of 1200° C. and a maximum temperature of 1750° C. for approximately one-half hour.

The substitution of the glaze No. 03201 in the above platinum bonding mixture would change the minimum firing temperature to 1225° C.

The substitution of the glaze No. 03202 in the foregoing platinum bonding mixture would change the minimum firing temperature to 1275° C.

Care should be taken to avoid over-firing of the bonding mixture at too high a firing temperature, or at a temperature at or above the melting point of the metal incorporated in the mixture, to prevent agglomeration of the metal particles and a resulting poorly conducting joint cross-section. The agglomeration effect is an easily visible one.

As an example of one of the foregoing bonding mixtures, a mixture containing 23% by volume of the total solids of gold powder, 77% by volume of the total solids of the glaze No. 1607, and an additional 20% by volume of squeegee oil, is placed as a small globule on a gold-rich terminal, printed and previously fired on an alumina substrate. The lower loop of a cylindrically-wound, 12 mil diameter, gold connecting wire is immersed in the globule and the whole is fired at 1000° C. for approximately one-half hour. Subsequent testing of the joined area at a temperature of 600° C. shows that a 370-gram pull, which corresponds to an applied tension of about 7,200 p.s.i., is required to pull the connecting wire free from the globule.

As another example of one of the bonding mixtures, a mixture containing 23% by volume of the total solids of platinum powder, 77% by volume of the total solids of the glaze No. 03201, and an additional 20% by volume of squeegee oil, is placed as a small globule on a platinum-rich terminal, printed and previously fired on an alumina substrate. The lower loop of a cylindrically-wound, 10-mil diameter, platinum connecting wire is immersed in the globule and the whole fired at 1250° C. for approximately one-half hour. The firing atmosphere and pressure are standard or ambient. Subsequent testing of the joined area at a temperature of 750° C. shows that a 407-gram pull, which corresponds to a tension of about 11,400 p.s.i., is required to pull the connecting wire free from the globule.

It is to be understood that the examples submitted herein are operatively successful embodiments of the present invention and that substitutions and modifications may be made therein without departing from the scope of this invention.

We claim:

The method of making an electrical connection of a length of wire having at least one loop on an end thereof to a printed terminal layer that is selected from the group that consists of gold, platinum and silver layer fired on an alumina substrate and that remains connected under tensile forces of a magnitude in the order of up to about 11,400 pounds per square inch at temperatures up to about 750° C., by combining together as the bonding mixture a borosilicate glaze that is selected from the group that consists of lead borosilicate and barium borosilicate with from by volume 23% to 99% of total solids of a noble metal that is selected from the group that consists of platinum and gold and as an addition to the 100% mixture of metal and glaze with from by volume 15% to 25% of an oily vehicle that is selected from the group that consists of squeegee oil and pine oil as the bonding mixture that is used, applying a globule of the bonding mixture to the layer fired on the alumina substrate, and firing the globule containing the wire loop for one-half hour within the temperature range of about from 920° C. to 1250° C. at about one atmosphere of pressure.

References Cited in the file of this patent

UNITED STATES PATENTS

| | | |
|---|---|---|
| 1,651,709 | Jones | Dec. 6, 1927 |
| 2,057,790 | Potter et al. | Oct. 20, 1936 |
| 2,189,640 | Powell | Feb. 6, 1940 |
| 2,220,961 | Kern | Nov. 12, 1940 |
| 2,248,415 | Schwartzwalder et al. | July 8, 1941 |
| 2,267,571 | McDougal | Dec. 23, 1941 |
| 2,335,376 | Ballintine et al. | Nov. 30, 1943 |
| 2,371,613 | Fair | Mar. 20, 1945 |
| 2,385,580 | Knox | Sept. 25, 1945 |
| 2,398,176 | Deyrup | Apr. 9, 1946 |
| 2,402,031 | Ffield | June 11, 1946 |
| 2,509,909 | Davis | May 30, 1950 |
| 2,619,519 | Marks | Nov. 25, 1952 |
| 2,636,920 | Lockery | Apr. 28, 1953 |
| 2,734,151 | Jacobs | Feb. 7, 1956 |
| 2,748,321 | Kamm | May 29, 1956 |
| 2,793,949 | Imich | May 28, 1957 |
| 2,940,161 | Elarde | June 14, 1960 |
| 2,964,881 | Janssen | Dec. 20, 1960 |